J. HENDY.

Concentrators.

No. 6,164.

Reissued Dec. 8, 1874.

Witnesses

Jno. L. Boone

E. M. Richardson

Inventor

Joshua Hendy by Dewey & Co

Attys

THE GRAPHIC CO. PHOTO-LITH. 39 & 41 PARK PLACE, N.Y.

UNITED STATES PATENT OFFICE.

JOSHUA HENDY, OF SAN FRANCISCO, CALIFORNIA.

IMPROVEMENT IN CONCENTRATORS.

Specification forming part of Letters Patent No. 53,976, dated April 17, 1866: reissue No. 6,164, dated December 8, 1874; application filed September 3, 1874.

*To all whom it may concern:*

Be it known that I, JOSHUA HENDY, of San Francisco, in the State of California, have invented certain Improvements in Ore-Concentrators; and I hereby declare the following to be a full, clear, and exact description thereof.

My invention relates to improvements in that class of machines for concentrating sulphurets and the heavy particles of metal in ores, in which an inclined concentrating-surface is surrounded with an outside rim, and mounted upon a vertical shaft, about which it moves in a reciprocating or back-and-forth semi-rotary motion.

My improvements consist, first, in an improved construction of the concentrating-surface or pan-bottom, whereby I am enabled to compensate for the lack of centrifugal force near the center of motion, so that the heavy particles will be readily thrown to the periphery of the pan; and, secondly, to an improved arrangement for discharging the sulphurets continuously or at intervals from the pan, while it is under motion.

Figure 3:
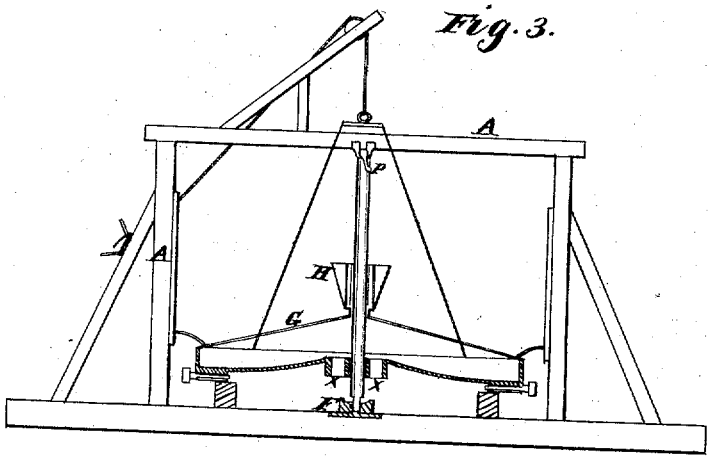
Figure 2:
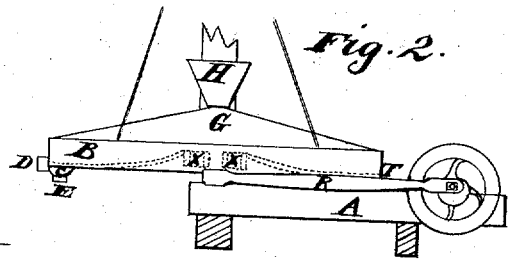
Figure 4:
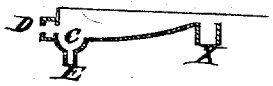
Figure 5:
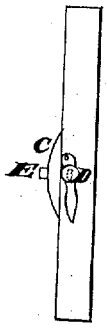
Figure 1:
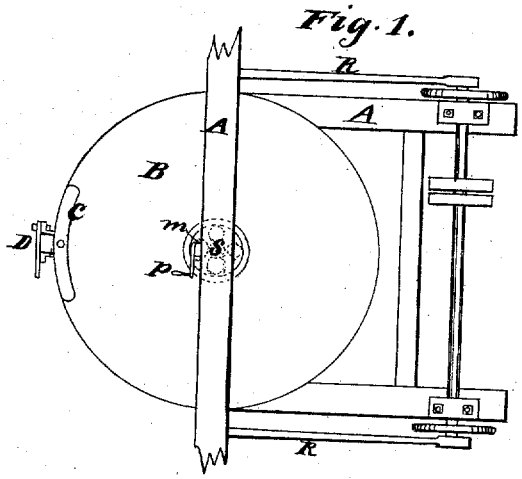

Referring to the accompanying drawings, Figure 1 is a top view of the pan. Fig. 2 is a side view. Fig. 3 is a cross vertical section from side to side. Fig. 4 is a section of a portion of the pan. Fig. 5 is a front view of the pan.

A is a frame of wood upon which the concentrator is mounted. The pan B is circular in form, and has a vertical shaft, S, passing down through its center and stepping in a suitable socket, F, in the frame A beneath. The pan is secured to this shaft so that it can be reciprocated, or given a semi-rotary or back-and-forth motion, by means of pitmen R, which connect with a crank on the ends of the driving-shaft. The bottom of the pan is made with a concave curvilinear upper surface. The form of curve which is most desirable is the one represented at Fig. 2, in which the greatest angle is nearest the center, and the amount of curve gradually diminishes toward the periphery. The advantage of this curve is that the steepness of the curve near the center will act to carry the particles toward the periphery, until the centrifugal force, caused by the movement of the pan, catches them and moves them outward with a uniform speed, thus compensating for the lack of centrifugal force near the center. This quality is necessary in order to obtain a regularly and perfect working machine.

It will be noticed that although the center of the pan is set horizontally, its bottom is higher at one side than at the other. This construction provides a gradually-descending channel from the summit of the upper side, around the pan each way to the lowest point on the opposite or discharge side, thus giving a gradual descent or inclination toward the point of discharge, and providing a continuous automatic discharge when the pan is running. C is a horn-shaped cavity or trough, opposite, and in proximity to, the outlet D, and having another outlet, E, from its bottom. X X are outlets at the center of the pan. When the shaft S is perpendicular, the center outlet rim should be horizontal. F is a step for the shaft S to work in, and is so arranged as to slide forward and back in the frame-work of the machine. The upper end of the shaft S has a collar around it, to which is affixed a screw, *m*, and crank or nut P, by means of which the shaft is moved forward and back in a groove in frame A, see Figs. 1 and 3. G is a convex distributer, of sheet-iron or other suitable material, with a collar at its center for the shaft S to work through. This distributer is suspended over the top of the pan, as shown in Fig. 3, and is provided with a hopper, H. R R are rods worked by cranks or eccentrics, to give an oscillatory motion to the pan.

The operation is as follows: The tailings are conducted into the hopper H, and, with water, are distributed by the hood G to the inside of the pan at or near its periphery. The pan being horizontal, the declination of the bottom from the point T downward to the outlet D causes the concentrated particles to move toward said outlet; the oscillatory motion of the pan agitates said contents, causing the earthy and light particles to be carried off through the central outlet X X; while the inclination of the curve of the bottom, being greatest near its center, throws the sulphurets and other heavy particles, such as amalgam, &c., toward the periphery of the pan. The horn-shaped cavity or trough C catches the amalgam, and operates upon it in the same manner as by the process known to miners as horning. The pan B can be inclined forward in the direction of the outlet D by bringing the top of the shaft S forward by means of the screw *m* and crank or nut P, or their equivalent. The rods R R at the same time draw the lower part of the shaft and the step F in the opposite direction.

The oscillatory motion of the pan may be continued with the same facility as when the pan was in a horizontal position. The position and motion of the pan when so inclined are similar to the operation of panning-out by hand, in use by miners. When the pan is used in a horizontal position, the outlet D may be kept more or less open, giving a continuous discharge, or opened at such intervals as may be necessary. In cleaning up or washing out, the pan should be inclined forward.

I am aware that others have attempted to apply an automatic discharge to a concentrator constructed with a horizontal bottom, and provided with inclined grooves in the periphery leading to opposite discharges. But this is not my invention. The inclined grooves forming the descending channel had, necessarily, to be cut very deep as the channel approached the discharge, in order to secure the required incline, to make it automatic in its action. To use grooves also necessitated the construction and use of two discharges, to avoid the entire destruction of the amalgamator by the great depth of an inclined grooove which encircled the whole horizontal bottom. The groove was found to be objectionable in consequence of soon filling up with the heavier particles of metal and concentrated matter, and ceasing to act. It is evident from my construction—that is, forming my descending channel by the smooth, inclined, curvilinear bottom with the side of the pan—that the whole bottom surface of my concentrator furnishes a descending channel toward the discharge, and secures an efficient and constantly-operating automatic discharge, without danger of being choked or filled up, and without necessitating the use of two discharges.

Having thus described my invention, what I claim as new, and desire to secure by Letters Patent, is—

1. In an amalgamator, a pan having a curved bottom, the greatest inclination of which is near the central discharge, and gradually diminishing in inclination as it approaches the periphery of the pan, substantially as described, and for the uses and purposes hereinbefore set forth.

2. The pan B, having its bottom inclined toward the discharge D, and having a central discharge provided with a horizontal rim, substantially as and for the purpose set forth.

3. In combination, with a circular reciprocating concentrating-pan, having a smooth or nearly smooth and gradually-declining bottom, as described, the automatic discharge, substantially as herein set forth.

4. The horn-shaped trough *c*, in combination with oscillatory pans or concentrators, as herein described.

5. The horn-shaped trough, in combination with pans or concentrators having curved or convex bottoms.

6. The shaft S, with screw *m*, and crank or nut P, and step F, for the uses and purposes hereinbefore set forth.

7. The oscillatory pan, with curved or convex bottom, horn-shaped cavity *c*, outlets X, D, and E, in combination with the adjustable shaft S, substantially as described, and for the uses and purposes as hereinbefore set forth.

JOSHUA HENDY.

Witnesses:

JNO. L. BOONE,

C. M. RICHARDSON.